United States Patent [19]
Schimanek

[11] Patent Number: 6,097,617
[45] Date of Patent: Aug. 1, 2000

[54] CONVERTER WITH LOW-INDUCTANCE CAPACITOR IN AN INTERMEDIATE-CIRCUIT ASSEMBLY

[75] Inventor: Ernst Schimanek, Nürnberg, Germany

[73] Assignee: Semikron Elektronic GmbH, Germany

[21] Appl. No.: 09/417,975

[22] Filed: Oct. 13, 1999

[30] Foreign Application Priority Data

Oct. 13, 1998 [DE] Germany ............................ 198 47 029

[51] Int. Cl.$^7$ ....................................................... H02M 1/00
[52] U.S. Cl. ............................................. 363/144; 363/141
[58] Field of Search ..................................... 363/141, 144, 363/146; 361/624, 637, 688, 807

[56] References Cited

U.S. PATENT DOCUMENTS 5,132,896  7/1992  Nishizawa et al. ..................... 363/144
5,880,951  7/1992  Inaba ....................................... 363/144

FOREIGN PATENT DOCUMENTS 27 39 242  2/1979  Germany ................................ 363/144

*Primary Examiner*—Matthew Nguyen
*Attorney, Agent, or Firm*—Morrison Law Firm

[57] ABSTRACT

Capacitors and power electronic components, such as power switches of hybrid configuration, are positioned with low inductance and in close proximity to each other on one said of an intermediate-circuit assembly, below a flat intermediate-circuit bus. The bus and the capacitors and power electronic components are electrically and conductively connected. An electrically insulated and heat-dissipating cooling body is positioned on the other side of the intermediate-circuit assembly. At least a portion of the converter circuitry or the entire converter is arranged in a single housing. The result is a compact and reliable electronic circuit arrangement for a converter.

4 Claims, 2 Drawing Sheets

CONVERTER WITH LOW-INDUCTANCE CAPACITOR IN AN INTERMEDIATE-CIRCUIT ASSEMBLY

BACKGROUND OF THE INVENTION

The present invention relates to a converter for sophisticated requirements, having low-inductance capacitors in an intermediate-circuit assembly.

Converters of high power density are sufficiently known in the prior art. In DE 41 10 339 C2, a DC/AC converter with DC leads is characterized by several smoothing capacitors connected in series and in close proximity to at least one DC lead. The DC leads were designed in the form of plates. The arrangement of the discretely designed capacitors in relation to the intermediate circuit and the circuit parts of the converter is shown in the figures and described in the text of DE 41 10 339 C2.

DE 42 32 763 C2 suggests that a converter can be made by using multilayer connector buses, describing their low-inductance positioning. In that solution, too, the starting point is the use of discretely arranged capacitors.

An even better defined position of the outer ports of discrete capacitors, related to the above, is described in DE 196 19 538 A1. Furthermore, to realize a converter arrangement with the lowest possible inductance, several suggestions are made for the circuitry of the DC-carrying circuit portions.

In summary, conventional power electronics systems use various individual components to form a complete converter. In power electronics, the design of the switches causes the greatest loss. For that reason, the switches are mounted on a cooling system.

In more recent versions of converters, the drive is integrated into the design of the power electronics and is contacted by means of solder pins flush with the power portion, or electrically, by means of positive connections. The intermediate circuit is provided with electrolytic or foil capacitors. The intermediate-circuit bus is advantageously of low inductance and in sandwich form, while the connection to the power electronics is accomplished by means of a detachable screw connection.

Screw connections as well as soldered connections create additional inductance in the commutation circuits, thereby limiting the maximum possible intermediate-circuit voltage. Furthermore, space and access must be provided for the screw connections, which defeats the purpose of a compact design of high component density.

OBJECTS AND SUMMARY OF THE INVENTION

It is an object of the present invention to provide a compact and reliable electronic circuit arrangement in the form of a converter for sophisticated requirements.

It is a further object of the present invention to provide a electronic circuit arrangement in the form of a converter having capacitors of low inductance integrated into the intermediate circuit.

DETAILED DESCRIPTION OF THE INVENTION

Figure 1:
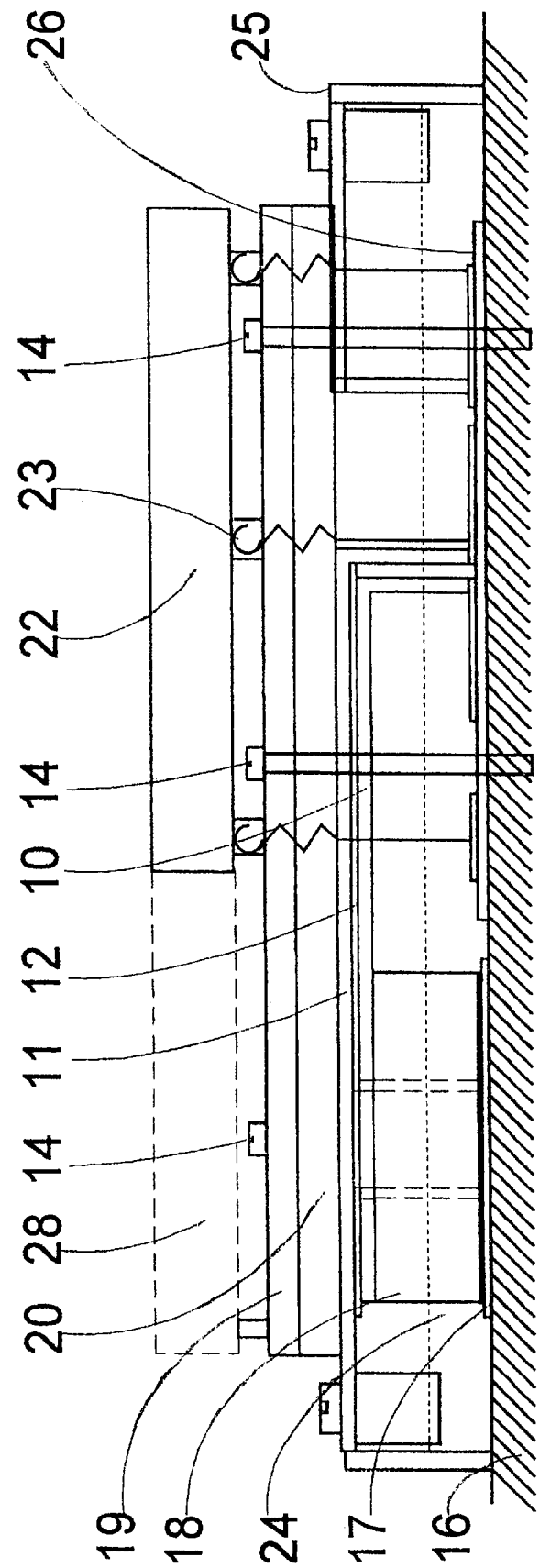
FIG. 1 is a cross section of a circuitry according to the present invention.

Referring to FIG. 1, power electronics 26, in the form of circuit-friendly diodes and transistors as power electronics components which have been soldered to ceramic insulators, are positioned in a housing 25. Intermediate circuit capacitors 18 and the associated extremely low-inductance intermediate-circuit bus 10, 11, and 12 are built into the same housing as main components.

Electrical contacts are provided via springs 23 of sufficient cross-section and appropriate elastic force. The force of springs 23 is applied between a bridge element 19, which is clamped several times with a screw connection 14, to a cooling body 16. The pressure arrangement, consisting of at least one pressure spring system 20 and one bridge element 19 can be either designed separately or jointly for power-electronics 26 portion and a capacitor 18 portion.

As protection against environmental effects, an insulation seal 24, provided in housing 25, seals against cooling body 16. The auxiliary elements such as a drive circuit 22, optionally having digital signal processing 28, are connected in the same manner with power electronics 26 via contact springs 23. Integrated into the system of the converter, according to the present invention, and also connected with contact springs for signal relaying, are temperature and current sensors (not shown).

The invention allows the creation of a compact current intermediate-circuit converter of very high component density whose intermediate-circuit connection to the power electronics does not require any screw connections or soldered connections which increase the inductance. Therefore, the resulting intermediate-circuit converter has an extremely low inductance. Furthermore, this configuration eliminates at least one interface.

It is also possible to achieve the system according to the present invention, by integrating the circuit components, the power electronics, the intermediate-circuit capacitor, the intermediate-circuit bus, the sensors, the drive control and the microcontroller, in an at least partially hybrid, very compact design, which further reduces the number of required interfaces.

By integrating power electronics 26 and intermediate-circuit capacitors 18 on one plane of cooling body 16, the cooling of capacitors 18 is easily and very effectively accomplished via the cooling bodies by using a heat conductor plate 17.

The design of a complete converter according to the invention with all required circuit elements makes it possible to achieve the easy modification of the position of individual circuit elements in relation to each other, thereby resulting in a flexible and variable port design. This means that converter arrangements for different applications can be designed very favorably, without a loss of time, according to a modular system.

Figure 2A:
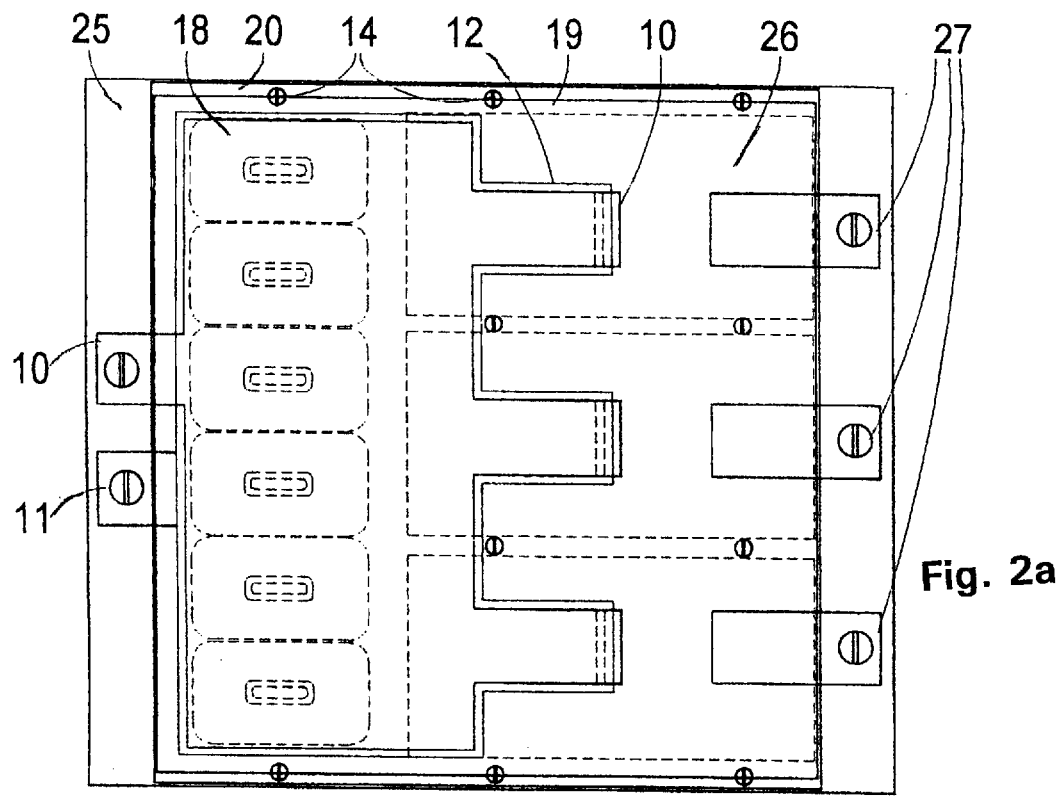
FIG. 2a is a top view of the circuitry according to the present invention.
Figure 2B:
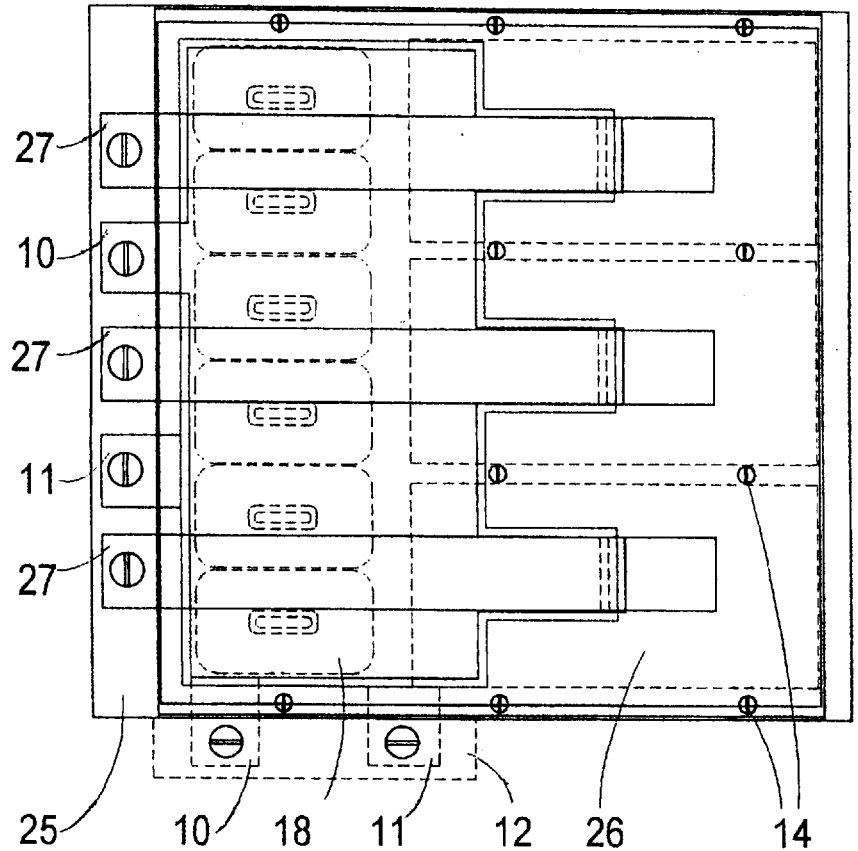
FIG. 2b is a top view of the circuitry according to an alternate embodiment of the present invention.

Referring to FIGS. 2a and 2b, the position of the individual parts of the intermediate-circuit assembly is shown. On one surface of housing 25, the plate-shaped DC tap from intermediate-circuit bus 10 and 11 is shown on the left side. Below the plane of intermediate circuit 10, 11, and 12 are six capacitors 18, stacked in close proximity to each other, in a configuration according to the present invention.

In a hybrid configuration, power electronics 26, shown in the form of the dotted contours of the three ceramic insulators with AC power ports 27 for the different current or voltage phases. By means of housing 25 and bridge element 19, the already described configuration is completed.

In the form of a converter according to FIG. 2a, DC power ports 10 and 11 are opposite those of the AC power ports 27. This form is very useful for a DC control servo or DC/AC converter. A configuration according to the form shown in FIG. 2b, with DC power ports 10 and 11 between AC power ports 27 is preferable when the converter is to function as a plug-in module.

However, it is conceivable to lead DC power ports 10 and 11 out, as drawn with broken lines in FIG. 2b. The flat design of the intermediate circuit makes it possible to form DC ports on all four sides of the converter. This configuration results in a converter according to the present invention which is adaptable for all conceivable applications.

All other elements of the converter circuit arrangement, such as screw connection 14, bridge element 19, pressure spring system 20, and their effect have been previously explained in terms of FIG. 1.

Because the capacitors are integrated into the power part of the converters and thus alternatively into the same housing as the power switches, space is saved and the number of interfaces is reduced. Conventional external bus, which is otherwise required, and the necessary capacitors built discretely upon them, is eliminated, and the unit of the complete converter with all circuit components (power switches in hybrid configuration as power electronics, modem sensors, intermediate-circuit bus, capacitors, drive control and microcontroller) can be designed as a complete module. This results in a great advantage when the converter is industrially manufactured. With modules produced in that manner, it is possible in converter modules, according to the present invention, to completely shield off parasitic harmonic waves which lead to radio interference.

As the power density of individual circuit components is increased, the problems posed by parasitic inductance become more significant. Thus, experiments have been published in which all parts carrying DC were positioned so that their two ports are arranged in the closest possible proximity to each other. Converters made according to the principles of the invention meet all the requirements of a low-inductance design.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A converter of a performance class for sophisticated requirements comprising:

power electronics;

said power electronics including power switches of hybrid configuration;

sensors;

a flat intermediate-circuit bus including capacitors;

a drive control;

a microcontroller;

at least one capacitor and power electronic components with low inductance on a first side of said intermediate-circuit assembly;

said flat intermediate-circuit bus electrically and conductively connected with said at least one capacitor and power electronic components;

an electrically insulated and heat-dissipating cooling body on a second opposite side of said intermediate-circuit assembly; and a housing containing some of at least said at least one capacitor and power electronic components.

2. A converter of a performance class for sophisticated requirements according to claim 1, wherein:

said capacitors having capacitor layers whose windings are of rectangular cross section;

at least two electrodes led out of a first side with low-inductance; and said at least two electrodes dimensioned so that they are at substantially the same height as said power electronics and said sensors.

3. A converter of a performance class for sophisticated requirements according to claim 2, wherein:

said at least two electrodes of said capacitors are electrically contacted with electrodes of said intermediate-circuit bus one of flush and with a positive connection.

4. A converter of a performance class for sophisticated requirements according to claim 1, wherein:

said capacitors, said sensors and said power electronics are electrically connected with said intermediate-circuit bus;

said intermediate-circuit bus being connected, one of directly and indirectly, by means of contact springs with said drive control; and a plurality of power ports are laterally led out of said housing.

* * * * *